United States Patent [19]

Pesiri

[11] 4,208,071
[45] Jun. 17, 1980

[54] RECLINABLE SEATING STRUCTURE

[75] Inventor: James B. Pesiri, Dana Point, Calif.

[73] Assignee: J. C. Sales & Mfg., Inc., Irwindale, Calif.

[21] Appl. No.: 865,706

[22] Filed: Dec. 29, 1977

[51] Int. Cl.² ............................................. A47C 1/025
[52] U.S. Cl. ................................. 297/369; 297/306
[58] Field of Search ............... 297/369, 368, 367, 366, 297/354, 355, 370, 371, 379, 304, 306

[56] References Cited

U.S. PATENT DOCUMENTS

| 2,286,784 | 6/1942 | Benzick et al. | 297/368 |
|---|---|---|---|
| 2,997,341 | 8/1961 | Borgia | 297/369 |
| 3,185,525 | 5/1965 | Welsh | 297/379 X |
| 3,424,492 | 1/1969 | Tabor | 297/379 X |
| 3,481,646 | 12/1969 | Tabor | 297/367 X |
| 3,514,155 | 5/1970 | Close | 297/379 |
| 3,918,822 | 11/1975 | Rauschenberger | 297/355 X |

FOREIGN PATENT DOCUMENTS

| 223979 | 1/1959 | Australia | 297/369 |
|---|---|---|---|
| 292365 | 6/1968 | Australia | 297/366 |

*Primary Examiner*—William E. Lyddane
*Attorney, Agent, or Firm*—Edward J. DaRin

[57] ABSTRACT

A reclinable seating structure in the form of a tubular framing structure having a pair of control means pivotably secured in a spaced arrangement on the seating structure and coupled together to be controlled and pivoted in unison for latching and unlatching the back supporting structure between an upright and a plurality of reclining positions.

3 Claims, 7 Drawing Figures

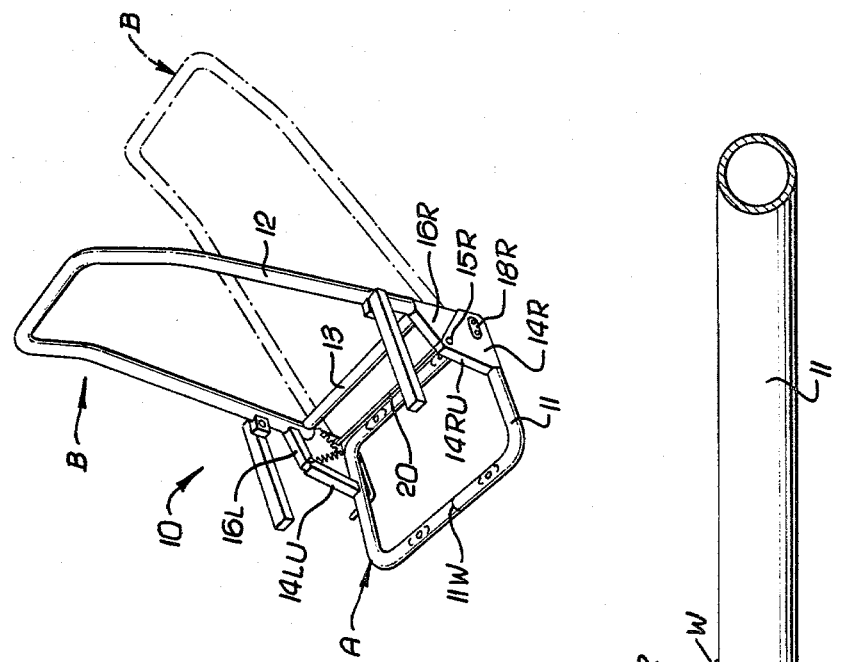
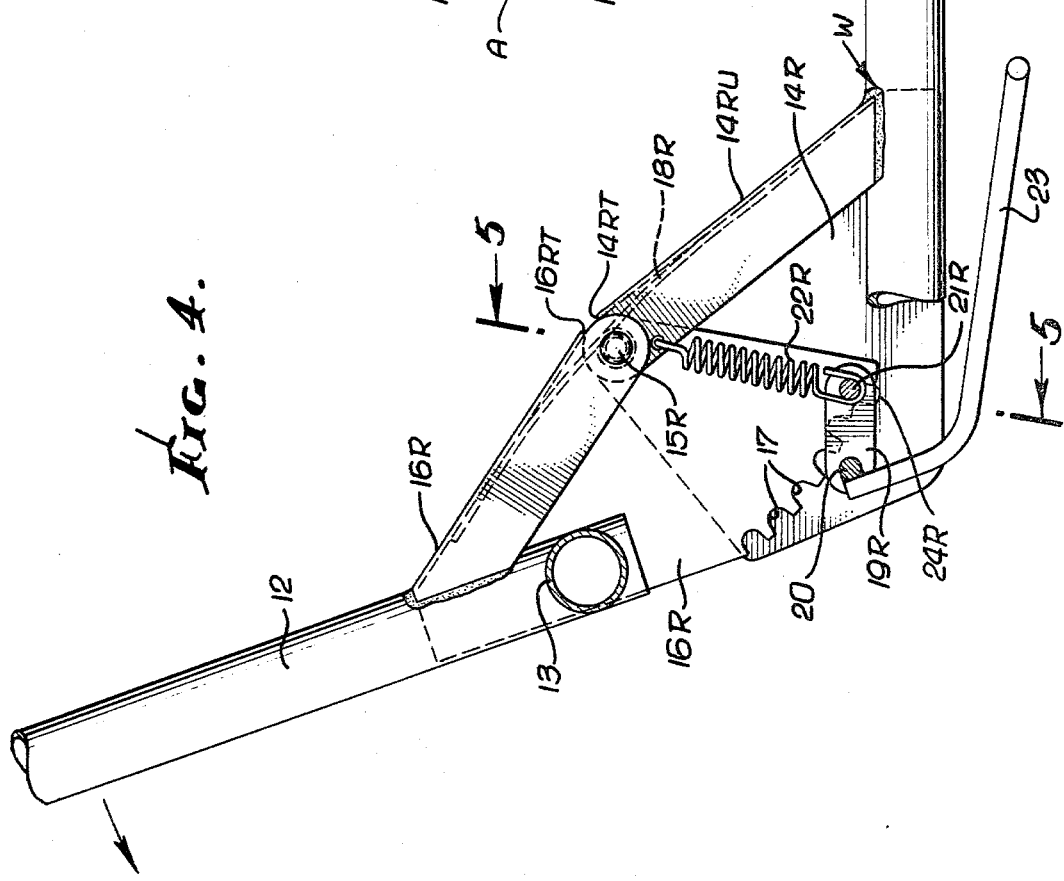

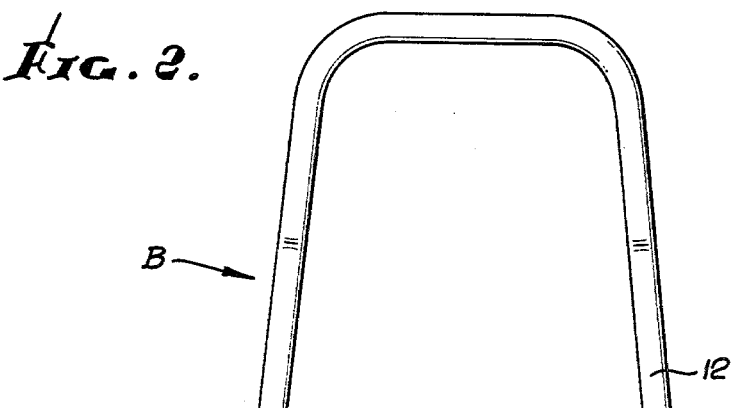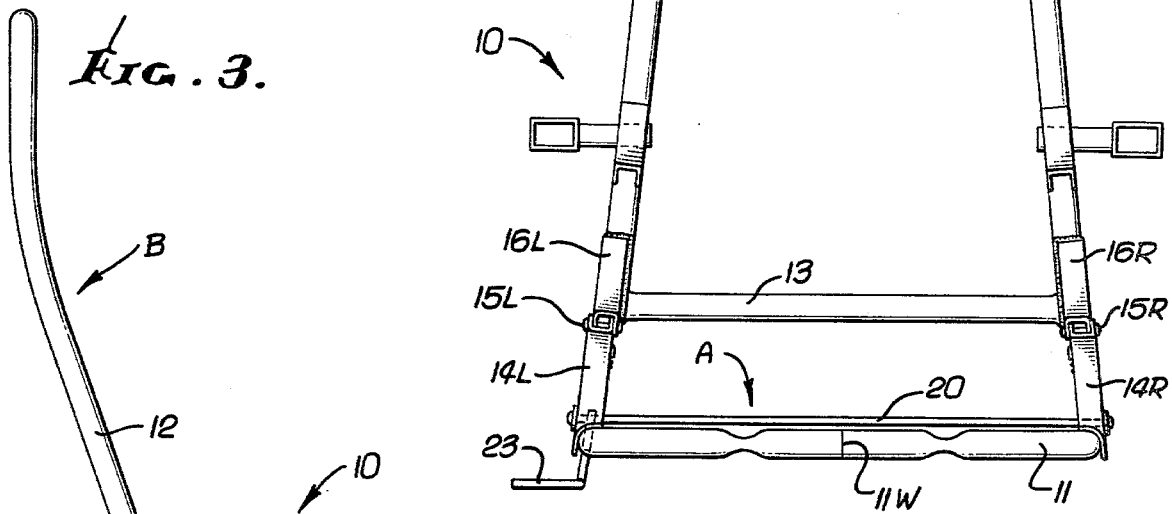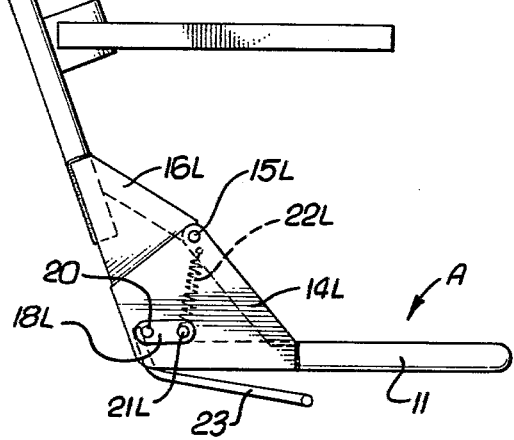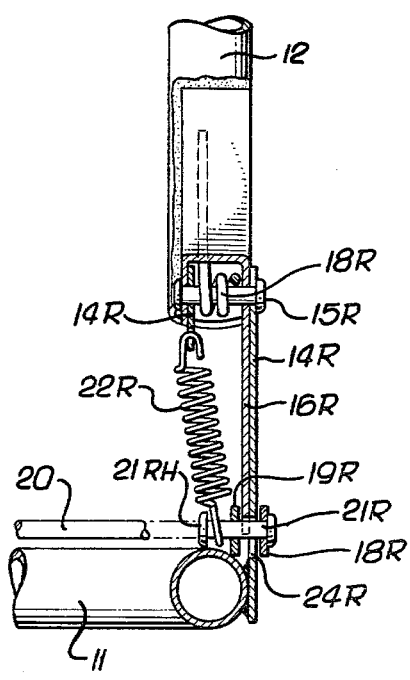

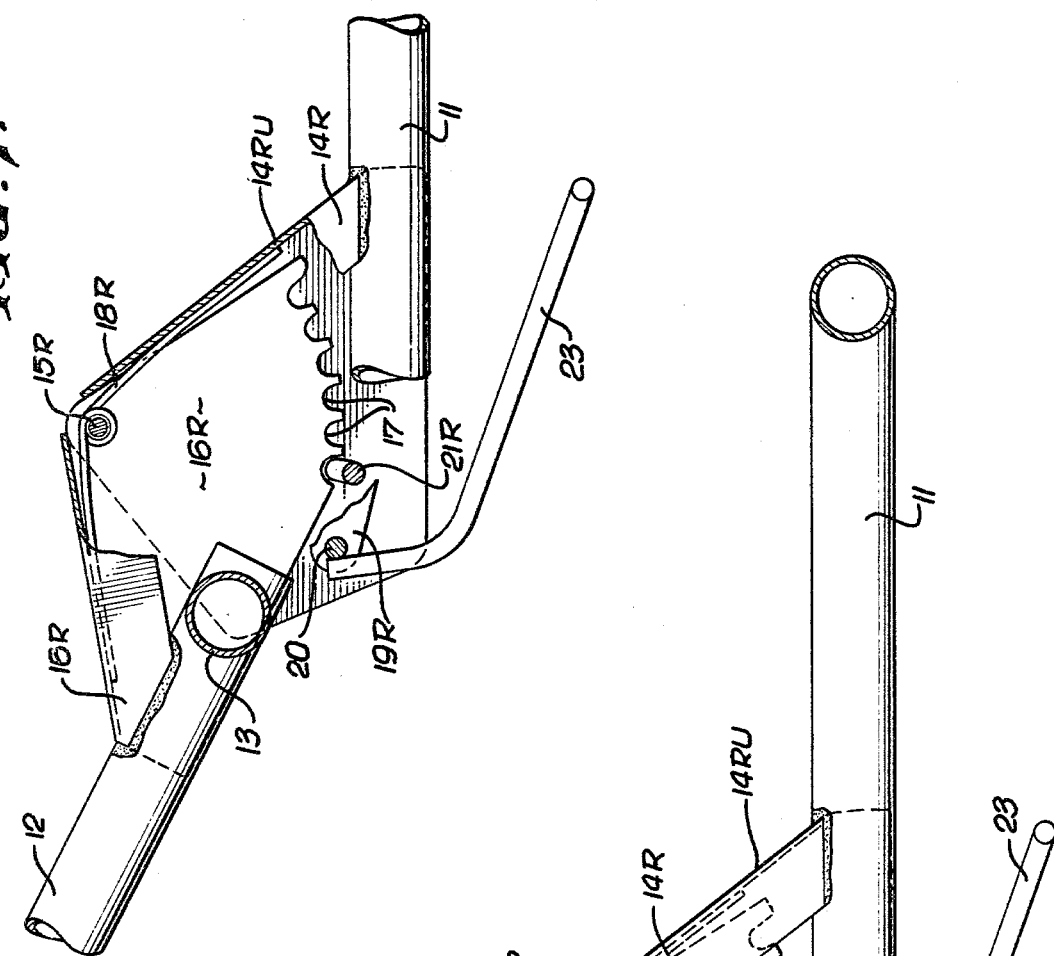
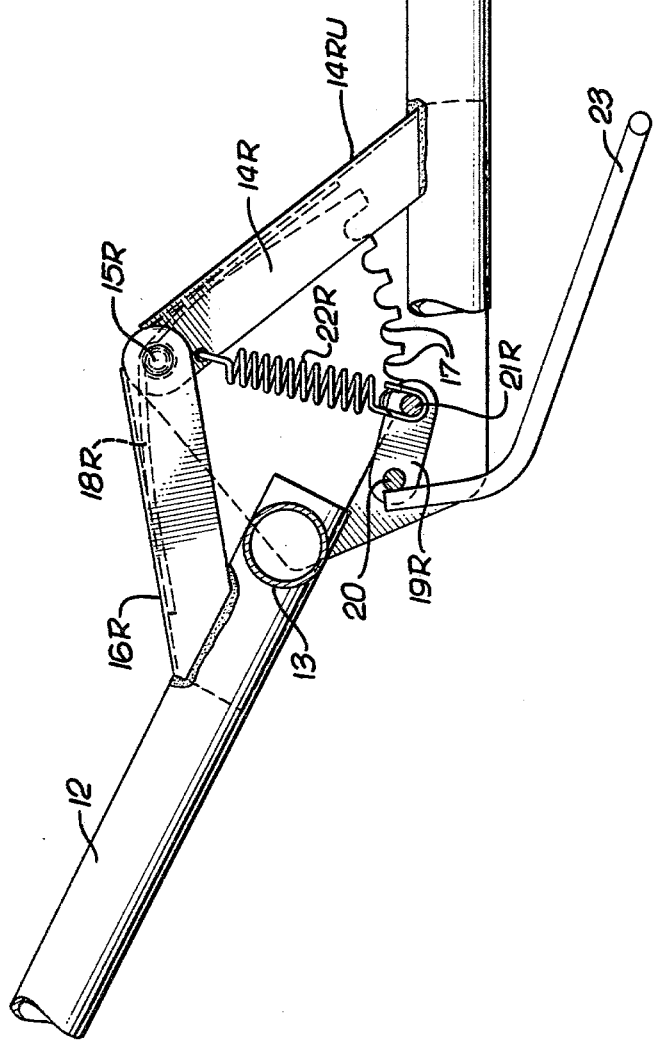

RECLINABLE SEATING STRUCTURE

DESCRIPTION OF THE PRIOR ART AND THE PRESENT INVENTION

This invention relates to a reclinable seating structure and more particularly to a seating structure frame.

Various types of seating structures are presently available for use in motor vehicles including trucks, vans, buses and motor homes. These seating structures are generally constructed on a suitable frame and upholstered to provide comfortable seating structures for sitting or reclining. At the present time, tubular frame structures adapted for use in motor vehicles are commercially available. One such prior art frame structure is disclosed and claimed in my copending patent application bearing Ser. No. 772,634 filed on Feb. 28, 1977, now abandoned in favor of Ser. No. 914,489 filed June 12, 1978 and assigned to the same assignee as the present invention. The prior art type of reclinable frame structures generally have a control mechanism that is secured or locked on only one side which permits movement or "play" at the outer end of the back supporting frame.

The present invention provides an improved, reclinable frame structure wherein the control mechanism for the back supporting structure is latched on two sides thereby resulting in less movement or play at the outer end of the back supporting frame than in prior art structures having only a single locking or latching structure. The dual latching mechanism of the present invention is also advantageous in that the seating load is distributed to both control mechanisms and therefore each control mechanism is only subjected to one-half of the seating load or the pressure exerted against the back structure for reclining same. The control mechanism is advantageously constructed to completely house the control elements to prevent their exposure that would normally result in tearing or damaging the upholstery. The tubular frame structure constructed in accordance with the present invention provides a structure that is easy to upholster wherein no upholstery foam can enter into the control mechanism. The overall weight of the frame structure disclosed herein is approximately five pounds resulting in economies in shipping the seating frame.

From a structural standpoint, the present invention comprehends the frame for a reclinable seating structure or the like comprising a tubular structure having a preselected configuration and width for accepting and securing a seating structure and constructed and defined as a frame for the seating structure. The frame includes another tubular structure having a preselected configuration and a width substantially the same as the width of the seating frame and adapted to accept and secure a back support for a sitter and constructed and defined as a back supporting frame that is swingably secured to the tubular seating structure. The combination includes means for movably securing the back supporting structure to the seating structure to permit the back supporting structure to be selectively moved to the plurality of angular positions relative to the seating structure and secured in position. The latter means includes a pair of control means pivotably secured to the seating structure in a spaced arrangement and being coupled together to be controlled and pivoted in unison and normally latched for maintaining the back support structure in an upright position and adapted to be moved to a plurality of angular positions and swingable between the angular positions and the upright position. The control means includes a single manually operative control means accessible to the sitter for latching and unlatching the pair of control means in unison to permit the back supporting structure to be positioned in the desired reclinable position in response to the pressure exerted by the sitter against the unlatched back supporting structure to move it to the desired position and latching it in the desired position.

These and other features of the present invention may be more fully appreciated when considered in the light of the following specification and drawings, in which:

FIG. 1 is a perspective view of a reclinable seating structure embodying the present invention and with the back supporting structure shown in a fully reclined position in dotted outline;

FIG. 2 is a front end, elevational view of the seating structure of FIG. 1;

FIG. 3 is a left-side elevational view of the seating structure as illustrated in FIGS. 1 and 2;

FIG. 4 is a partial, elevational view of the left-hand side of the seating structure illustrated in FIG. 3, with portions broken away and illustrated in section, and with the back supporting structure illustrated in the latched upright position;

FIG. 5 is a cross-sectional view taken along the line 5—5 of FIG. 4;

FIG. 6 is a partial, elevational view of the left-hand side of the seating structure, with portions broken away and illustrated in section, as illustrated in FIG. 4 but with the back supporting structure illustrated in the latched fully reclined position; and FIG. 7 is a partial, elevational view of the seating structure as illustrated in FIG. 6 but with portions broken away to illustrate the details of the control mechanism.

Now referring to the drawings, the seating frame structure 10 of the present invention will be examined in detail. The seating structure 10 embodying the present invention will be described as it may be embodied in a tubular frame structure adapted for use in various types of motor vehicles although the concept is applicable to other similar types of seating structures. Basically, the seating structure 10 comprises a seating frame A and a back supporting structure B illustrated in FIG. 1 as having a high back configuration. The back supporting structure B is movably secured to the seating structure A to allow it to be positioned at a plurality of angular positions relative to the seating structure A for reclining purposes. In its normal position the back supporting structure B is arranged upright as illustrated in FIG. 1 and may be moved from this position backwardly to various angular positions, including a reclining position as the terminal position of the back supporting structure B. The tubular structure comprising the seating structure 10 is constructed of a minimal of tubular elements throughout with each element bent and shaped to provide the desired configuration, contour and structural rigidity. The individual tubular elements utilized for the seating structure A and the back supporting structure B are welded for minimizing the assembly operations for the seating structure 10. The seating element A, for example, includes a single tubular element 11 bent into a rectangular configuration with the free ends of the element 11 welded together at 11W. The back supporting structure B is similarly constructed of a single tubular element 12 shaped with a high back, contoured, U-shaped configuration and having a second tubular element 13 welded at the open end of the element 12 for closing the open end of the "U" formed by the tubular element 12.

The seat frame structure A mounts a pair of upstanding members 14R and 14L adjacent each of the back corners of the framing structure and adjacent the tubular element 13 as viewed in FIG. 1. Members 14R and 14L consist of a pair of flat plates having one end constructed and defined to have a U-shaped configuration respectively identified as 14RU and 14LU. The members 14R and 14L are secured, such as by welding, to the tubular element 11 at point W; see FIG. 4, for example. The top end of the members 14R and 14L are provided with a cut-out portion 14RT and 14LT at the portion bridging the arms of the U for defining an ear-like area on the arms of the U-shaped sections. The ear-like areas are apertured for receiving pivot pins 15R and 15L. The back supporting structure B mounts a pair of dependent toothed members 16R and 16L arranged adjacent the members 14R and 14L, respectively, for pivotal coaction therewith. The toothed portions of the members 16R and 16L are secured to the tubular element 12 to extend adjacent the back ends of the respective members 14R and 14L and to be slidable over the surfaces of the members 14R and 14L. The members 16R and 16L are both identically constructed and have a plurality of teeth for defining six latching detents 17 for providing an upright position and five reclining positions. The members 16R and 16L also have one end constructed to have a U-shaped configuration with the lower ends provided with a cutout portion 16RT and 16LT at the portions bridging the arms of the U and pivot pin apertures on the arms of the U-shaped section. The two U-shaped sections for the members 14R, 14L, 16R and 16L are coupled together and pivotably secured by the respective pivot pins 15R and 15L as illustrated. This arrangement allows the back supporting structure B and the members 16R and 16L to be movable with respect to the seating structure A.

Each pivot pin 15R and 15L carries biasing means in the form of a yieldable spring 18R and 18L for biasing the back supporting structure A in an upright position. The spring 18R illustrated in FIG. 7 is shown in the form of a stiff wire having a plurality of wraps around the pin 15R with the free ends extending inside the U-shaped sections for the members 14R and 16R and in engagement therewith. The spring 18R is adapted to be in tension for returning the structure A to an upright position when it is unlatched or free to swing.

The thus defined control means are controlled to be pivoted or moved in unison by the provision of a control mechanism carried by the upstanding members 14R and 14L. For this purpose each member 14R and 14L is provided with a pair of link elements 19R and 19L arranged on opposite sides of the members 14R and 14L. A control rod 20 is nonrotatably secured to both pairs of link elements 19R and 19L to extend across the back of the structure A and secures the link elements on the opposite sides of the members 14R and 14L by means of a suitable aperture provided on the members 14R and 14L (not shown). The opposite ends of the pair of link elements 19R and 19L carry latching pins 21R and 21L that travel in elongated apertures provided in the upstanding members 14R and 14L similar to the aperture 22R illustrated in FIGS. 4 and 5. The apertures 22 are defined to permit the latch pins 21R to move into and out of engagement with the latching detents 17 for respectively latching and unlatching the members 16R and 16L. Each latching pin 21R and 21L secures the corresponding pair of link elements 19R and 19L together with the pins extending beyond the toothed sector and having heads 21RH and 21LH on the ends thereof. The heads for each of the pins 21R and 21L secure one end of tension springs 22R and 22L with the opposite ends being secured to the upstanding members 14R and 14L as illustrated in FIG. 5. The tension springs 22R and 22L are extendable for permitting the latching pins 21R and 21L to be moved out of the path of the toothed sectors for the members 16L and 16R and to return the pins to a latch position when the back structure B is held stationary.

The control rod 20 has a manually operable control arm 23 secured thereto and is movable in a clockwise direction for rotating the rod 20. The rotation of the rod 20 is effective to move the latching pins 21R and 21L out of the path of the toothed sectors in unison thereby permitting the back supporting structure B to be moved to a new position. When the structure B is in an upright position, it can be moved to the desired reclining position by the sitter exerting pressure against the back structure until the desired position is reached and then releasing the control arm 23 for permitting it to be latched in position. When the back structure B is in a reclined position it can be moved upwardly or to the upright position by operating the control arm 23 and releasing the pressure on the structure B until the desired position is reached.

With the above structure in mind, it will be appreciated that the control mechanism is readily adaptable to similar seating structures having different widths by merely varying the length of the control rod 20 in accordance with the desired width of the seating frame structure A. This arrangement has been found useful for seating structures having widths varying from 18 inches up to 74 inches. The control arm 23 may also be mounted to the control rod 20 in any convenient location.

It should now be appreciated by those skilled in the art that the above-disclosed reclinable seating structure has achieved the above advantages and has advanced the state of the art.

What is claimed is:

1. A frame for a seating structure adapted to be moved from an upright to a plurality of reclinable positions, the frame being constructed and defined to be upholstered for use in a motor vehicle such as a van, motor home or the like comprising a first tubular structure constructed and defined as a closed loop of a preselected configuration and of a width for accepting and securing a seating structure and rigidly constructed to function as a frame for the seating structure, a second U-shaped tubular structure having a preselected length for the arms of the "U", a straight tubular element secured adjacent the open end of the second tubular structure functioning as a cross arm to close the "U" formed by the second tubular structure whereby the thus secured arrangement is adapted for accepting and securing an upholstered back supporting structure, a pair of upstanding flat plates secured adjacent the opposite corners of the first tubular member, each of the upstanding plates having only their forward facing ends defined to have a U-shaped configuration with the U-opening towards the rear of the tubular member, the above-defined back supporting structure including flat dependent plates having toothed portions adjacent one end and secured thereto adjacent the opposite ends of said straight tubular element, the flat plates having only their forward dependent ends arranged on the ends opposite to the toothed portions defined to have a U-shaped configuration with the U-opening toward the rear and arranged to be inclined downwardly and extending forwardly with respect to said second tubular structure so as to terminate adjacent the U-shaped portions of the upstanding plates, the free ends of each of the aforementioned U-shaped portions of the upstanding and dependent plates having their free ends recessed for permitting relative pivotal movement, a pair of pivot pins for individually coupling each one of the upstanding plates to one of the dependent plates and being coupled to extend between the arms of each U-shaped portion of said plates and said members at the recessed ends thereof and to be secured thereto for permitting the flat plates having the toothed portions to slide on the inside surfaces of an individual one of said upstanding plates, spring wire means wrapped around each of the pivot pins and having elongated ends seated along and completely nested against the inside surfaces of each of the U-shaped portions of said coacting upstanding and dependent plates for biasing the back supporting structure towards an upright position, whereby the spring wire means is isolated from any upholstery material and the like to thereby eliminate any interference for the operation of a reclining control means, a control rod extending between the upstanding plates at the rear ends thereof and adjacent the back portion of the first tubular structure, the control rod extending through the upstanding plates, a pair of link elements secured to the free ends of the control rod for sliding movement with the outside surfaces of the upstanding plates, a pair of latching pins secured to the opposite ends of the link elements from the control rods, the upstanding elements having apertures defined adjacent each of the latching pins for permitting the pins to extend therethrough and to controllably slide therein from one end of an aperture to the opposite end, while being moved into and out of engagement with the teeth of said toothed members, manual control means secured to the control rod for moving the latching pins into and out of engagement with the teeth of the toothed members, and yieldable means individually secured between each latching pin to one of the U-shaped portions of said plates secured by the pivot pins, the yieldable means being defined for urging the latching pins into engagement with the teeth of the toothed member for maintaining the second tubular element in the selected position relative to the first tubular structure.

2. A frame for a seating structure as defined in claim 1 wherein the tubular elements and associated elements are secured together by welding.

3. A frame for a seating structure as defined in claim 2 wherein each toothed member has a multiplicity of teeth for defining an upright position for the second tubular element relative to the first tubular structure and five different reclined positions for the second tubular element relative to the first tubular structure.

* * * * *